(12) United States Patent
Toshine (10) Patent No.: US 8,065,466 B2
(45) Date of Patent: Nov. 22, 2011

(54) LIBRARY APPARATUS, LIBRARY SYSTEM AND METHOD FOR COPYING LOGICAL VOLUME TO DISK VOLUME IN CACHE DISK WITH SMALLEST ACCESS LOAD

(75) Inventor: Naoyoshi Toshine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 735 days.

(21) Appl. No.: 12/222,118

(22) Filed: Aug. 1, 2008

(65) Prior Publication Data

US 2009/0043960 A1 Feb. 12, 2009

(30) Foreign Application Priority Data

Aug. 10, 2007 (JP) ................. 2007-209777

(51) Int. Cl.
*G06F 13/00* (2006.01)
*G06F 12/00* (2006.01)

(52) U.S. Cl. ................ 711/4; 711/6; 711/111; 711/113; 711/159; 711/161; 703/23

(58) Field of Classification Search .............. 711/4, 6, 711/111, 118, 159, 161, 113; 703/23
See application file for complete search history.

(56) References Cited

U.S. PATENT DOCUMENTS

| 6,718,427 | B1 * | 4/2004 | Carlson et al. ............... 711/5 |
| 6,834,324 | B1 | 12/2004 | Wood |
| 6,978,325 | B2 * | 12/2005 | Gibble et al. ............... 710/33 |
| 7,107,417 | B2 * | 9/2006 | Gibble et al. ............... 711/161 |
| 7,308,528 | B2 | 12/2007 | Kitamura et al. |
| 7,631,157 | B2 * | 12/2009 | Kano ............... 711/161 |
| 7,853,764 | B2 * | 12/2010 | Bitner et al. ............... 711/161 |
| 2008/0177960 | A1 * | 7/2008 | Friauf et al. ............... 711/162 |
| 2008/0250197 | A1 * | 10/2008 | Daily et al. ............... 711/111 |
| 2009/0248974 | A1 * | 10/2009 | Bello et al. ............... 711/111 |

FOREIGN PATENT DOCUMENTS

| JP | 11-327805 | 11/1999 |
| JP | 2004-510243 | 4/2004 |
| JP | 2005-055945 | 3/2005 |

* cited by examiner

*Primary Examiner* — Hong Kim (74) *Attorney, Agent, or Firm* — Staas & Halsey LLP (57) ABSTRACT

A virtual library apparatus emulates a library apparatus by storing a logical volume on a cache disk. The library apparatus has a first storage medium and a second storage medium. The virtual library apparatus includes a disk volume, a determining unit, a monitor, and a copying unit. The disk volume forms the cache disk. The determining unit determines the logical volume to be copied. The monitor monitors access load to the disk volume and selects the disk volume having the smallest access load on the basis of the monitoring result. The copying unit copies the determined logical volume from the first storage medium to the selected disk volume, and copies the copied logical volume from the disk volume to the second storage medium.

12 Claims, 9 Drawing Sheets

| DISK VOLUME NUMBER | MANAGEMENT INFORMATION | LOGICAL VOLUME NUMBER | ACCESS LOAD % |
|---|---|---|---|
| 01 | LV001 ~ LV100 | LV050 ~ LV100 | 20 |
| 02 | LV101 ~ LV200 | LV101 ~ LV120 | 10 |

FIG. 4B

| DISK VOLUME NUMBER | MANAGEMENT INFORMATION | LOGICAL VOLUME NUMBER | ACCESS LOAD % |
|---|---|---|---|
| 01 | LV001 ~ LV100 | LV050 ~ LV100 | 20 |
| 02 | LV101 ~ LV200 | LV101 ~ LV120 LV180 ~ LV190 | 10 |

| DISK VOLUME NUMBER | MANAGEMENT INFORMATION | LOGICAL VOLUME NUMBER | ACCESS LOAD % |
|---|---|---|---|
| 03 | LV301 ~ LV500 | LV301 ~ LV310 | 10 |
| 04 | LV501 ~ LV700 | LV501 ~ LV520 | 20 |

FIG. 7B

| DISK VOLUME NUMBER | MANAGEMENT INFORMATION | LOGICAL VOLUME NUMBER | ACCESS LOAD % |
|---|---|---|---|
| 03 | LV301 ~ LV500 LV601 ~ LV640 | LV301 ~ LV310 LV601 ~ LV640 | 10 |
| 04 | LV501 ~ LV600 LV641 ~ LV700 | LV501 ~ LV520 | 20 |

LIBRARY APPARATUS, LIBRARY SYSTEM AND METHOD FOR COPYING LOGICAL VOLUME TO DISK VOLUME IN CACHE DISK WITH SMALLEST ACCESS LOAD

BACKGROUND

1. Field of the Technique

The present technique relates to a virtual tape-library apparatus that is between a host computer and a tape library apparatus, and stores tape data received and transmitted between the host computer and the tape library apparatus.

2. Description of the Related Art

Figure 1:
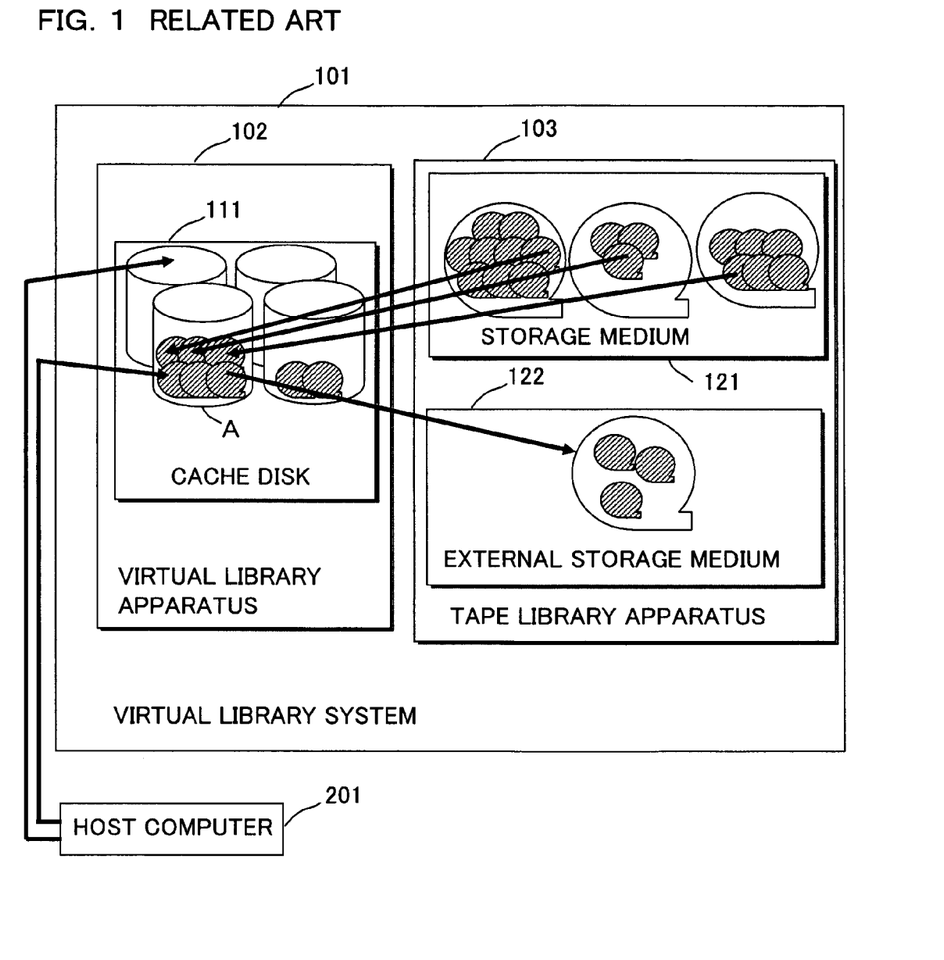
FIG. 1 is an explanatory diagram of a conventional virtual library system.

FIG. 1 is an explanatory diagram of a conventional virtual library system.

A virtual library system 101 connected to a host computer 201 has a virtual library apparatus 102 and a tape library apparatus 103. The virtual library apparatus 102 has a cache disk 111.

Further, the tape library apparatus 103 has a storage medium 121 for the virtual library apparatus 102 and an external storage medium 122.

The virtual library system 101 virtualizes a tape volume, and emulates the tape volume on the cache disk 111. Therefore, the virtual library system 101 does not have the concept of medium discharge provided for the conventional tape library apparatus 103. Then, the virtual library system 101 has an export function/import function, as a system for discharging the stored logical volume and for realizing an operation of external storage.

With the export function, a plurality of logical volumes stored in the storage medium 121 for the virtual library apparatus 102 are copied in a lump to the external storage medium 122 having a large capacity. The copied external storage medium 122 is externally extracted and is stored to an external archive.

With the import function, the external storage medium 122 externally-extracted from the virtual library system 101 with the export function is input to another virtual library system 101, thereby restoring the logical volumes.

In general, the logical volume in the virtual library system 101 is stored to the storage medium 121 for the virtual library apparatus 102 with a large capacity.

With export function/import function, upon executing the copying/restoring operation of the logical volume, the determined logical volume is copied to the cache disk 111 once. Further, at the import time, the logical volume is copied to the storage medium 121 for the virtual library apparatus 102 from the copied cache disk 111 and, at the export time, the logical volume is copied to the external storage medium 122.

As the cache disk 111, a disk array device is used and the cache disk 111 comprises a plurality of disk volumes. Further, the disk volumes are divided into a plurality of logical volumes. If the logical volume is assigned to the disk volume once, it is not subsequently changed.

Therefore, in frequent access to the logical volumes assigned to the same disk volume, the load is large. Further, access performance of the cache disk 111 deteriorates, thereby causing a case in which a normal processing capacity is not exhibited.

In particular, with the export function/import function, a large number of logical volumes are read and written once and the processing capacity is thus extremely reduced. FIG. 1 shows an example of causing the large load in a disk volume A in the export processing.

SUMMARY

It is an object of the present technique to provide a virtual library apparatus for preventing the access concentration to a specific disk volume of a plurality of disk volumes.

According to an aspect of an embodiment, the virtual library apparatus emulates a library apparatus by storing a logical volume on a cache disk. The library apparatus has a first storage medium and a second storage medium. The virtual library apparatus includes a disk volume, a determining unit, a monitor, and a copying unit. The disk volume forms the cache disk. The determining unit determines the logical volume to be copied. The monitor monitors access load to the disk volume and selects the disk volume having the smallest access load on the basis of the monitoring result. The copying unit copies the determined logical volume from the first storage medium to the selected disk volume, and copies the copied logical volume from the disk volume to the second storage medium.

DESCRIPTION OF THE PREFERRED EMBODIMENTS

First Embodiment

Figure 2:
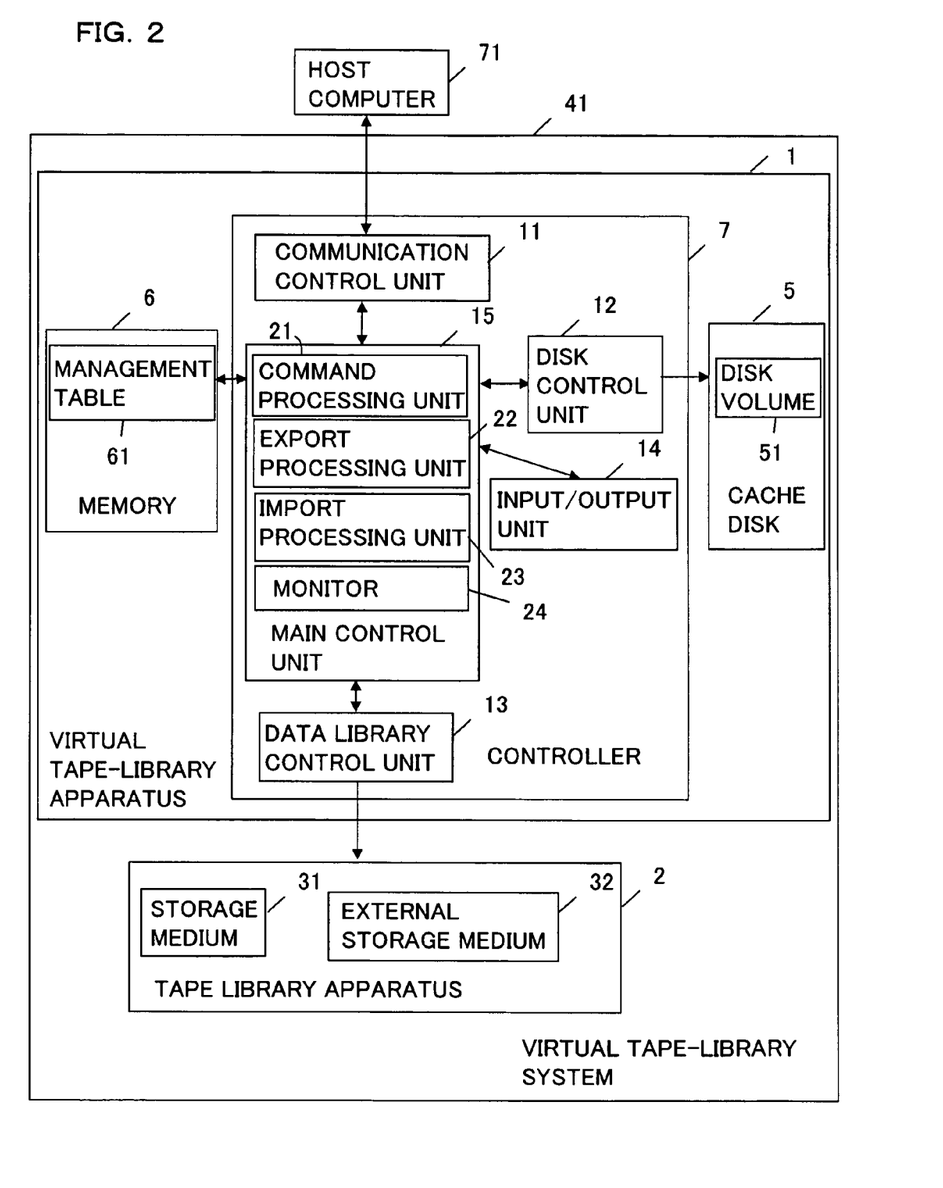
FIG. 2 is a diagram showing the structure of a virtual library system.

FIG. 2 shows the structure of a virtual tape-library system. A virtual tape-library system 41 comprises: a virtual tape-library apparatus 1; and a tape library apparatus 2. Further, the virtual tape-library system 41 is connected to a host computer 71.

The virtual tape-library apparatus 1 comprises: a cache disk 5; a memory 6; and a controller 7.

The virtual tape-library apparatus 1 virtually emulates the tape library apparatus 2 on the cache disk 5. Therefore, the host computer 71 can access data at a speed higher than that of the actual access to the tape library apparatus 2. That is, in the virtual tape-library apparatus 1, the virtual logical volume is disposed on the cache disk 5, and fast processing is thus realized without mechanical operations such as tape mounting and loading/unloading of the conventional tape library apparatus 2. Further, the tape library apparatus 2 is connected to the back end of the virtual tape-library apparatus 1, and the logical volume is written to a cartridge tape with a large capacity, as a storage medium 31 in the tape library apparatus 2 at the back end.

The cache disk 5 comprises a disk array device. Further, the disk array device comprises a plurality of disk volumes 51. Furthermore, a logical volume is stored to the disk volume 51. The logical volume is data based on the unit of the logical access upon accessing data in the tape library apparatus 2 from the host computer 71. One tape volume comprises a plurality of logical volumes. The disk volume 51 is a disk device that stores the logical volumes.

The memory 6 stores a management table 61. The management table 61 represents a corresponding relationship between the logical volume and the disk volume 51.

The controller 7 is a management server that systematically controls the virtual tape-library apparatus 1. Various control operations are performed by a processor (not shown). Further, programs for control are stored in advance to the memory 6. Furthermore, the controller 7 comprises: a communication control unit 11; a disk control unit 12; a data library control unit 13; an input/output unit 14; and a main control unit 15.

The communication control unit 11 controls the communication with the host computer 71.

The disk control unit 12 controls the communication with the cache disk 5.

The data library control unit 13 controls the communication with the tape library apparatus 2.

The input/output unit 14 performs input processing for determining the logical volume for export processing/import processing. Further, the input/output unit 14 performs output processing of a message. The input/output unit 14 is one example of determining unit.

The main control unit 15 systematically controls the virtual tape-library apparatus 1. Further, at the start time of the communication with the host computer 71, the logical volume is assigned to the disk volume 51. Furthermore, the main control unit 15 comprises: a command processing unit 21; an export processing unit 22; an import processing unit 23; and a monitor 24. The export processing unit 22 and the import processing unit 23 are one example of copying unit.

The command processing unit 21 performs processing corresponding to a command from the host computer 71. In response to the processing, data transfer between the host computer 71 and the cache disk 5 is controlled, data writing from the cache disk 5 to the tape library apparatus 2 is controlled, and data restoring from the tape library apparatus 2 to the cache disk 5 is controlled.

Upon receiving a mount command from the host computer 71, the command processing unit 21 obtains a logical volume number from data on the host computer, and selects the logical volume of the disk volume 51 by search for the management table 61. Upon receiving a write command, the command processing unit 21 writes data to the logical volume of the disk volume 51 selected by the mount command. Upon receiving a read command, the command processing unit 21 reads the data from the selected logical volume of the disk volume 51. Further, if there is not the logical volume on the cache disk 5, the restoring processing is performed from the tape library apparatus 2. Upon receiving an unload command, the command processing unit 21 resets the selection of the logical volume in the disk volume 51.

The export processing unit 22 first performs first copying operation to the cache disk 5 from the logical volume stored in the storage medium 31 in the tape library apparatus 2 by an instruction from the host computer 71 or the input/output unit 14. Subsequently, the logical volume is subjected to second copying operation to a cartridge tape of an external storage medium 32 in the tape library apparatus 2 from the cache disk 5. Further, if the determined logical volume exists on the cache disk 5, the export processing unit 22 directly copies the logical volumes from the cache disk 5 to the cartridge tape of the external storage medium 32 in the tape library apparatus 2. Furthermore, dynamic arrangement of the assignment of the logical volumes on the disk volume 51 is changed.

The import processing unit 23 first performs first copying operation to the cache disk 5 from the logical volume stored to the cartridge tape of the external storage medium 32 installed by the instruction from the host computer 71 or the input/output unit 14. Subsequently, the logical volume is subjected to second copying operation to the storage medium 31 in the tape library apparatus 2 from the cache disk 5. Further, the logical volumes on the disk volume 51 are assigned, and dynamic arrangement of the assignment of the logical volumes on the disk volume 51 is changed.

With the export/import function, in response to the instruction from the host computer 71, the virtual tape-library apparatus 1 performs the actual copy processing and the load is not thus applied to the host computer 71.

The monitor 24 checks the amount of access operation to the disk volume 51, thereby obtaining the access load. The access load is obtained by dividing the amount of access operation by a capacity of the disk volume 51. The amount of access operation is the total sum of the amount of access operation of the logical volume from the tape library apparatus 2 and the largest amount of access operation of the logical volume from the host computer 71, for every disk volume. Further, the monitor 24 selects the disk volume 51 having the smallest access load on the basis of the monitoring result. Furthermore, if there are a plurality of the disk volumes 51 having the same smallest access load, the disk volume 51 having minimum usage is selected.

The tape library apparatus 2 is defined to be divided into the storage medium 31 and the external storage medium 32.

The storage medium 31 is a cartridge tape used by the virtual tape-library apparatus 1, and comprises a plurality of cartridge tapes, and each cartridge tape stores the logical volume.

The external storage medium 32 is a cartridge tape for external storage.

(Export Processing)

The outline of the export processing will be described.

In the export processing, the logical volumes stored in the storage medium 31 in the tape library apparatus 2 are collected and are copied to the external storage medium 32.

Figure 3:
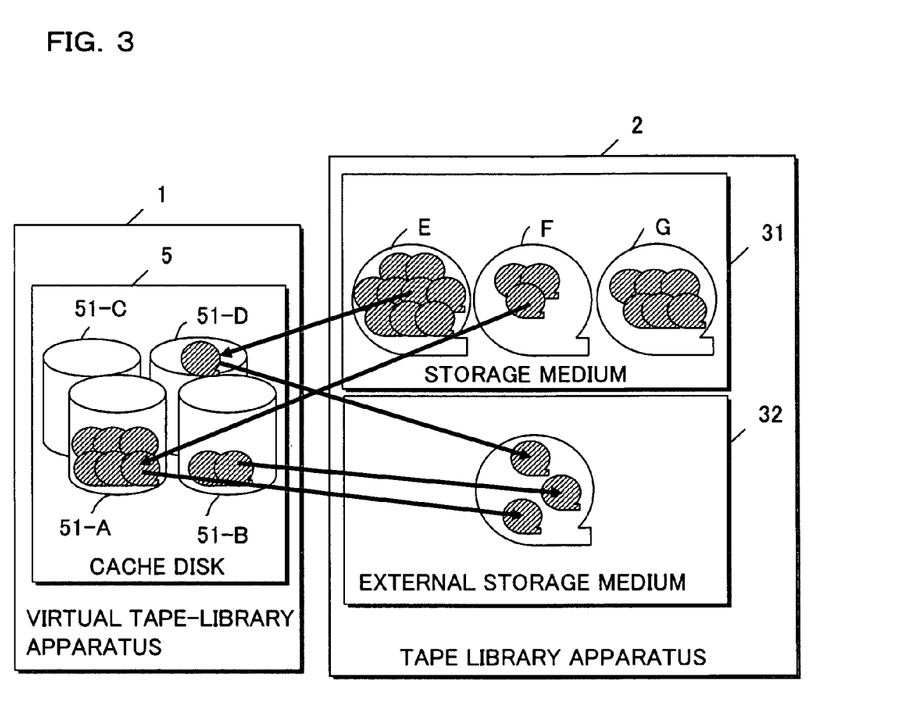
FIG. 3 is an explanatory diagram of export processing.

FIG. 3 shows an explanatory diagram of the export processing.

The logical volume is written from the host computer 71 and is already stored in the cache disk 5 and the storage medium 31 as an example.

The logical volumes on the disk volume 51 are assigned in advance and the management information of the logical volume is stored to the disk volume 51 in advance.

The management information indicates an identification number of the logical volume and information on the capacity thereof.

First of all, upon executing the export processing, the logical volume to be copied to the external storage medium 32 is determined as preparation.

The determination is input by reception of an instruction from the host computer 71 or the input/output unit 14 in the virtual tape-library apparatus 1.

After ending the preparation, the subsequent processing starts.

At this time, the processing is varied depending on as whether or not the logical volume exists on the cache disk 5.

(1) When it is determined that the determined logical volume exists on the cache disk 5, the logical volume is copied from the cache disk 5 to the external storage medium 32. In the example shown in FIG. 3, the logical volume determined to a disk volume 51-B is copied to the external storage medium 32.

(2) When it is determined that the determined logical volume does not exist on the cache disk 5, the logical volume stored in the storage medium 31 in the tape library apparatus 2 is temporarily stored to the cache disk 5. Thereafter, the logical volume is copied to the external storage medium 32. In the example shown in FIG. 3, when the determined logical volume exists in physical volumes E and F of the storage medium 31, the determined logical volume is copied to disk volumes 51-D and 51-A in the cache disk 5 in the virtual tape-library apparatus 1. Thereafter, the logical volume is copied to the external storage medium 32 from the disk volumes 51-D and 51-A.

At this time, the operation is distributed so as to prevent the concentration of the amount of access operation to the cache disk.

That is, the monitor 24 of the controller 7 monitors the amount of access operation of the cache disk 5.

The monitoring method of the amount of access operation with the monitor 24 is as follows.

The monitoring method is realized by periodically checking the amount of access operation on the basis of the unit of the disk volume 51 upon executing the export processing.

That is, the amount of access operation of the cache disk 5 is calculated by totally adding the logical volume to be currently used for every the disk volume 51.

At this time, the capacity of the logical volume is varied depending on the access to the cache disk 5.

In the access from the tape library apparatus 2 to the cache disk 5, the logical volume to be currently accessed is used. The access includes, e.g., restoring processing.

On the other hand, in the access from the host computer 71, the maximum logical volume is used. The capacity of the logical volume available in the access from the host computer 71 is defined as a maximum one because of the following two points. That is, first, the total amount of data written from the host computer 71 is not known. Secondly, the access of the host computer 71 is to be processed with the highest priority.

Upon executing the export processing, the disk volume 51 having the smallest amount of access operation is preferentially assigned as the storage destination of the logical volume.

With respect to the disk volumes 51 having the same amount of access operation, the disk volume 51 having the minimum usage is preferentially assigned as the storage destination of the logical volume.

Therefore, when the determined logical volume exists on the cache disk 5, it is checked whether or not the amount of access operation to the disk volume 51 having the determined logical volume is the smallest. When it is determined that the amount of access operation to the disk volume 51 having the determined logical volume is not the smallest, the amount of access operation of the disk volume 51 for storing the next determined logical volume is checked. On the other hand, when it is determined that the amount of access operation to the disk volume 51 having the determined logical volume is the smallest, the logical volume is copied to the external storage medium 32. Further, the logical volume on the cache disk 5 is sequentially checked. If there is a skipped logical volume, the logical volume is cyclically checked. The disk volume 51 for which all processing of the corresponding logical volumes ends is excluded from the check operation of the access load.

On the other hand, when the logical volume does not exist on the cache disk 5, the determined logical volume is copied from the tape library apparatus 2 to the disk volume 51 having the smallest amount of access operation.

After ending the copying operation, upon copying the determined logical volume to the disk volume 51 different from the disk volume 51 that is assigned in advance, the management information of the logical volume on the disk volume 51 assigned-previously is deleted. In this case, the management information is written to the disk volume 51 as the copy destination of the logical volume in the copying operation. As mentioned above, the dynamic arrangement of the logical volume is changed.

Figure 4A:
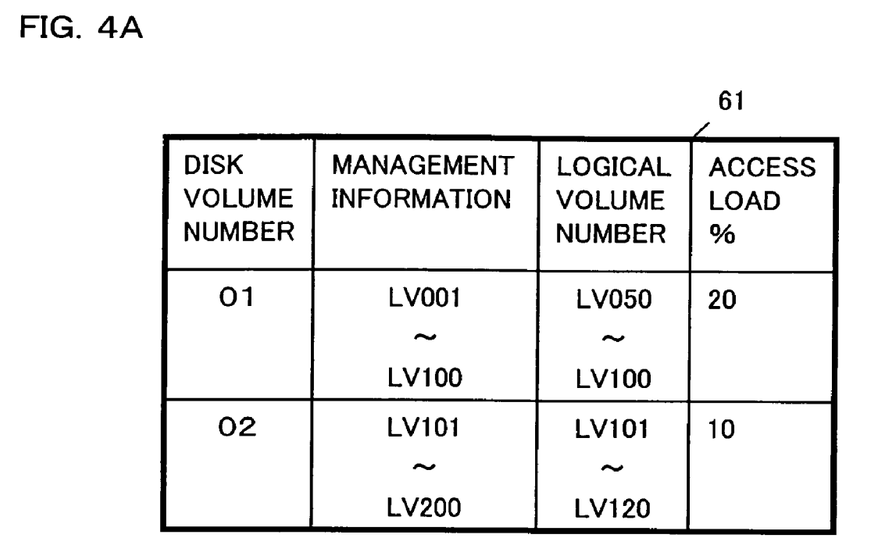
FIGS. 4A and 4B are first explanatory diagram of a management table.
Figure 4B:
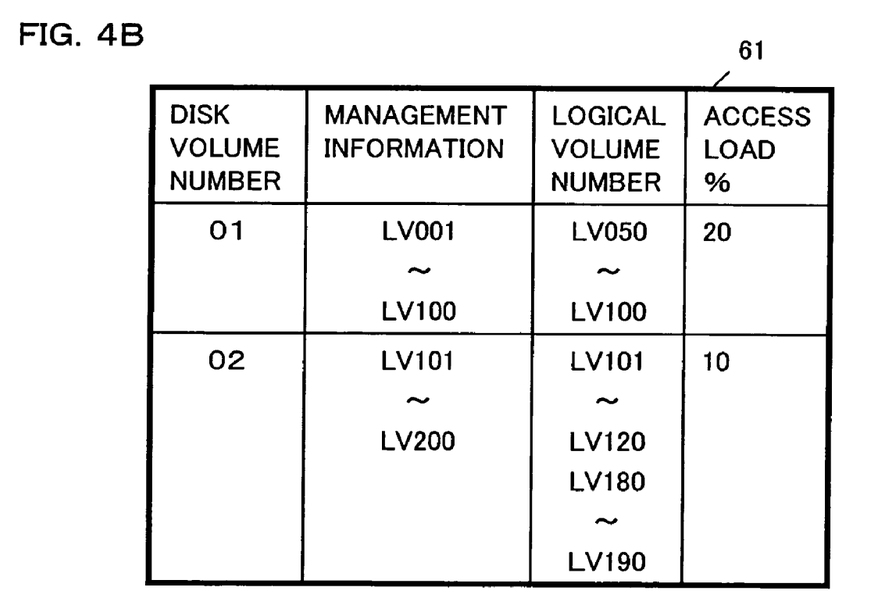

FIGS. 4A and 4B are first explanatory diagram of the management table.

The management table 61 stores the disk volume number, management information, logical volume number, and information on the access load.

The disk volume number is an identification number of the disk volume 51.

The management information is represented by the logical volume number.

The logical volume number represents the identification number of the logical volume whose data is stored to the disk volume 51.

For the purpose of a brief description, in the export processing, a description will be given by assuming that the amount of access load is not changed. The export processing is performed on the basis of the unit of logical volume.

Reference numerals LV050 to LV110 and LV180 to LV190 denote logical volume numbers as targets of the determined export processing.

FIG. 4A shows a state before the export processing.

Logical volume numbers LV001 to LV100 are assigned to a disk volume 51-01, as the management information. Logical volume numbers LV050 to LV100 denote the logical volumes for storing the data. Further, the access load thereof is 20%.

Logical volume numbers LV101 to LV200 are assigned to a disk volume 51-02 as the management information. The logical volume numbers LV101 to LV120 denote logical volumes for storing the data. Further, the access load thereof is 10%.

Therefore, the logical volume numbers LV050 to LV100 in the determined logical volume are in the cache disk 5. Therefore, the access load of the disk volume 51-01 and the disk volume 51-02 is checked. As the check result, the access load of the disk volume 51-01 is 20% and the access load of the disk volume 51-02 is 10%.

First, the logical volumes LV101 to LV110 and LV180 to LV190 having the smallest access load of 10% are subjected to the copying operation from the cache disk 5 to the external storage medium 32. Since the data does not exist on the cache disk 5, the logical volumes LV180 to LV190 are copied from the storage medium 31 to the disk volumes 51-02, and are thereafter copied to the external storage medium 32.

Subsequently, the remaining logical volumes LV050 to LV100 are subjected to the copying operation from the cache disk 5 to the external storage medium 32.

FIG. 4B shows the state after the export processing, in which the logical volumes LV180 to LV190 are added to the disk volume 51-02 from the storage medium 31.

Figure 5:
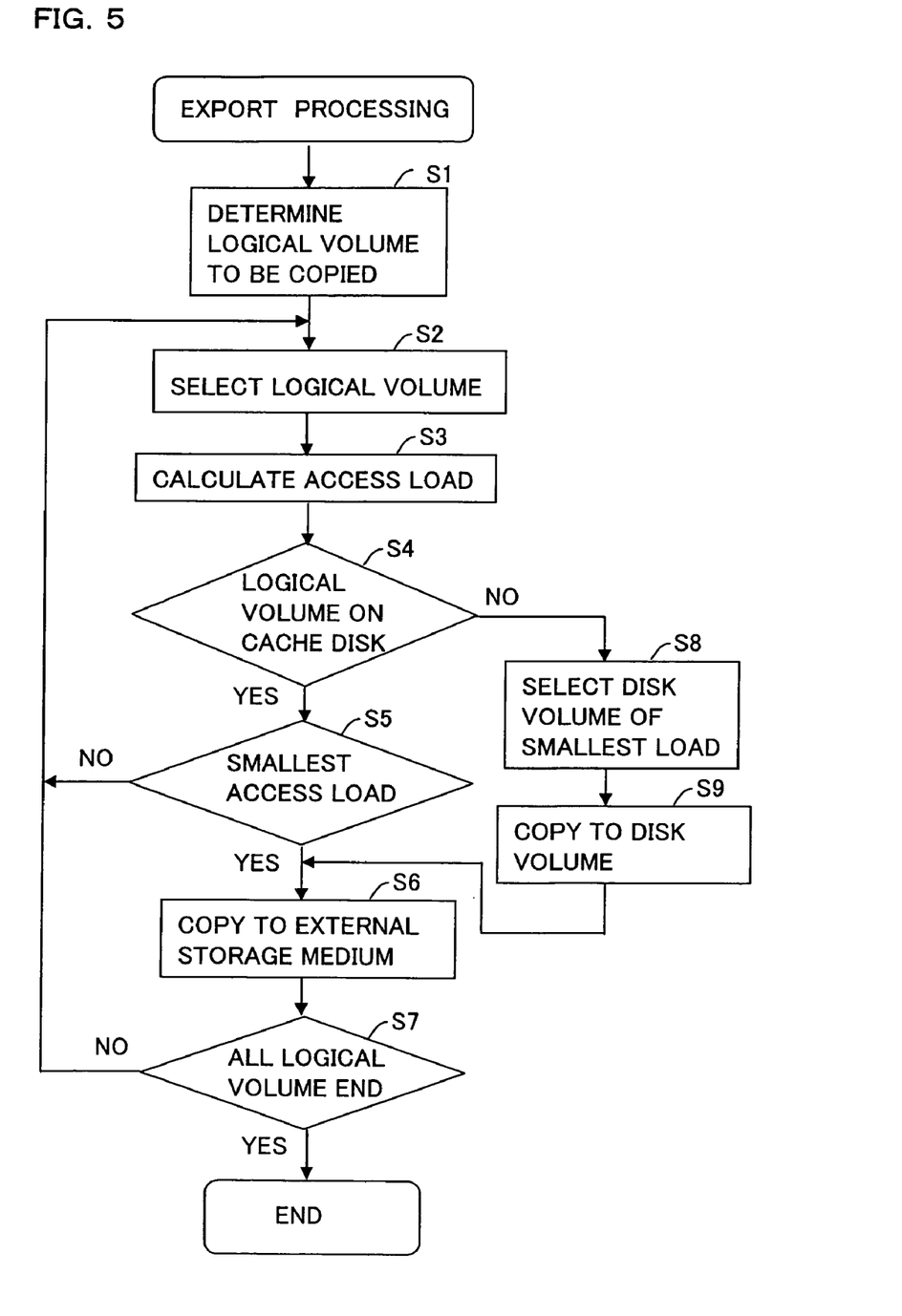
FIG. 5 is a flowchart of the export processing.

FIG. 5 shows a flowchart of the export processing.

It is assumed that the management information on the logical volume is generated in advance to the disk volume 51 and the management table 61 is generated.

A plurality of logical volumes to be copied to the external storage medium 32 are determined (in step S1).

Subsequently, the logical volume to be copied is selected from the determined logical volumes (in step S2).

Subsequently, the amount of the current access operation of the disk volume 51 is obtained, the access load thereof is calculated, and the calculated access load is stored in the management table 61. Thus the access load is obtained (in step S3).

It is checked on the basis of the management table 61 whether or not the selected logical volume exists on the cache disk 5 (in step S4).

When it is determined that the selected logical volume exists on the cache disk 5, it is checked whether or not the disk volume 51 for storing the selected logical volume has the smallest access load (in step S5).

When it is determined that the disk volume 51 for storing the selected logical volume does not have the smallest access load, the processing advances to step S2 so as to select the next logical volume.

On the other hand, when it is determined that the disk volume 51 for storing the selected logical volume has the smallest access load, the corresponding logical volume is copied to the external storage medium 32 (in step S6). At this time, when a plurality of the disk volumes that have the smallest access load are selected, the monitor 24 selects the disk volume of minimum usage from among them.

It is checked whether or not the copying operation of all determined logical volumes ends (in step S7).

When it is determined that the copying operation of all logical volumes does not end, the processing shifts to step S2 so as to select the next logical volume.

When the logical volume does not exist on the cache disk 5, the management table 61 is checked and the disk volume 51 having the smallest access load is selected (in step S8).

Further, the selected logical volume is copied to the selected disk volume 51 from the storage medium 31 in the tape library apparatus 2 (in step S9). After ending the copying operation, the processing shifts to step S6 whereupon the corresponding logical volume is copied to the external storage medium 32 from the disk volume 51 as the storage destination. At this time, upon copying the logical volume to the disk volume 51 different from the disk volume 51 assigned in advance, the management information on the logical volume of the original disk volume 51 is deleted. In this case, in the copying operation, the management information is written to the disk volume 51 for copying the logical volume. As mentioned above, the dynamic arrangement of the logical volume is changed. After the copying operation of all determined logical volumes ends, the export processing ends.

The discharged external storage medium 32 is stored to the external cabinet, thereby storing the data even at a disaster time of a data center.

(Import Processing)

The outline of the operation of import processing will be described.

In the import processing, the logical volumes stored in the external storage medium 32 are collected, and are copied to the storage medium 31 in the tape library apparatus 2.

Figure 6:
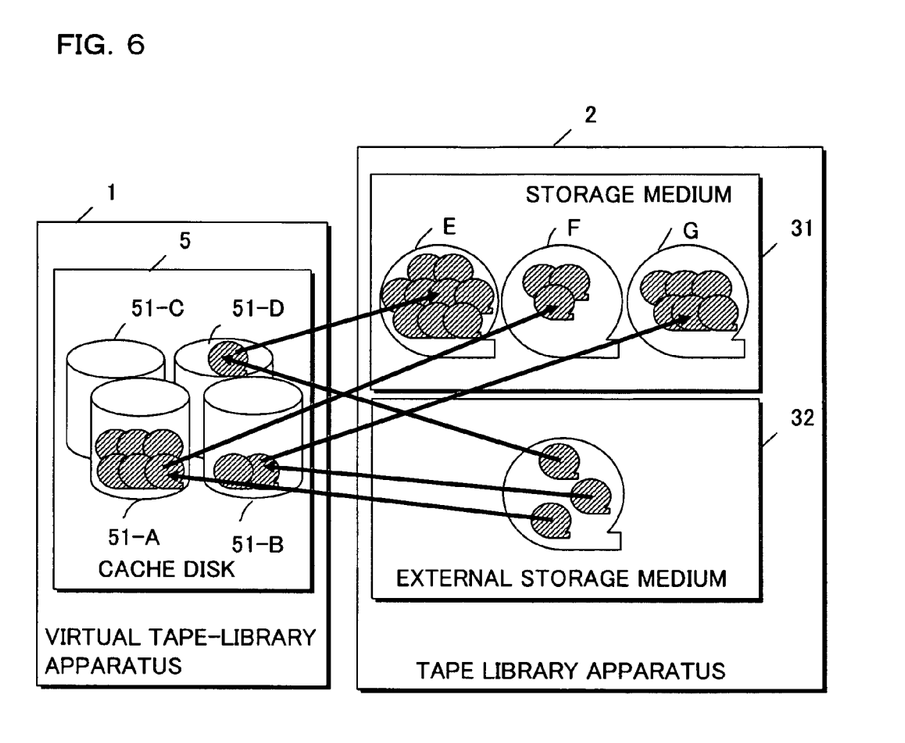
FIG. 6 is an explanatory diagram of import processing.

FIG. 6 is an explanatory diagram of the import processing.

Upon executing the import processing, the logical volume to be copied from the external storage medium 32 is determined as preparation.

The determination is input by reception of an instruction from the host computer 71 or by the input/output unit 14 in the virtual tape-library apparatus 1.

Subsequently, the restoring destination of the logical volume to be restored is structured in the virtual tape-library apparatus 1 as preparation upon restoring the logical volume from the external storage medium 32. At this time, the corresponding disk volume 51 is determined, based on the amount of used disk volume 51 in the cache disk 5. Further, the management information is stored to the assigned disk volume 51. The management information is, for example, an identification number of the determined logical volume.

Subsequently, directory information on a list of the logical volumes stored is read from the external storage medium 32, and the logical volume for restoration is checked. Accordingly, the logical volume to be read is determined. After ending the preparation, the next processing starts.

Upon sequentially restoring the logical volume checked by the directory information in the external storage medium 32, the monitor 24 checks the access load of the disk volume 51, and the logical volume is copied to the disk volume 51 having the smallest access load. After ending the copying operation, upon copying the logical volume to the disk volume 51 different from the disk volume 51 assigned in advance, the management information on the logical volume on the disk volume 51 assigned in advance is deleted. In this case, in the copying operation, the management information is written to the disk volume 51 to which the logical volume is copied. As mentioned above, the dynamic arrangement of the logical volume is changed.

Subsequently, the logical volume is copied from the disk volume 51 to the storage medium 31 in the tape library apparatus 2, and the restoring processing ends. When ending a series of processing of all logical volumes as the restoring target, the import processing ends.

The operation of the import processing in FIG. 6 is as follows.

After storing the determined logical volume from the external storage medium 32 to the disk volume 51-A in the cache disk 5, the logical volume is copied to the physical volume F in the storage medium 31. Subsequently, after storing the logical volume from the external storage medium 32 to the disk volume 51-B in the cache disk 5, the logical volume is copied to a physical volume G in the storage medium 31. Subsequently, after storing the logical volume from the external storage medium 32 to the disk volume 51-D in the cache disk 5, the logical volume is copied to the physical volume E in the storage medium 31.

Figure 7A:
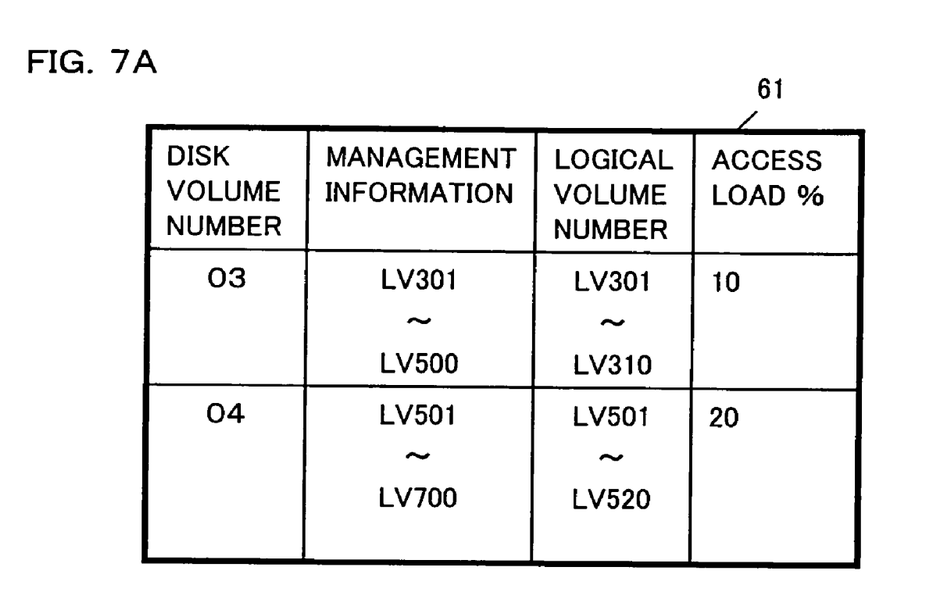
FIGS. 7A and 7B are second explanatory diagram of the management table.
Figure 7B:
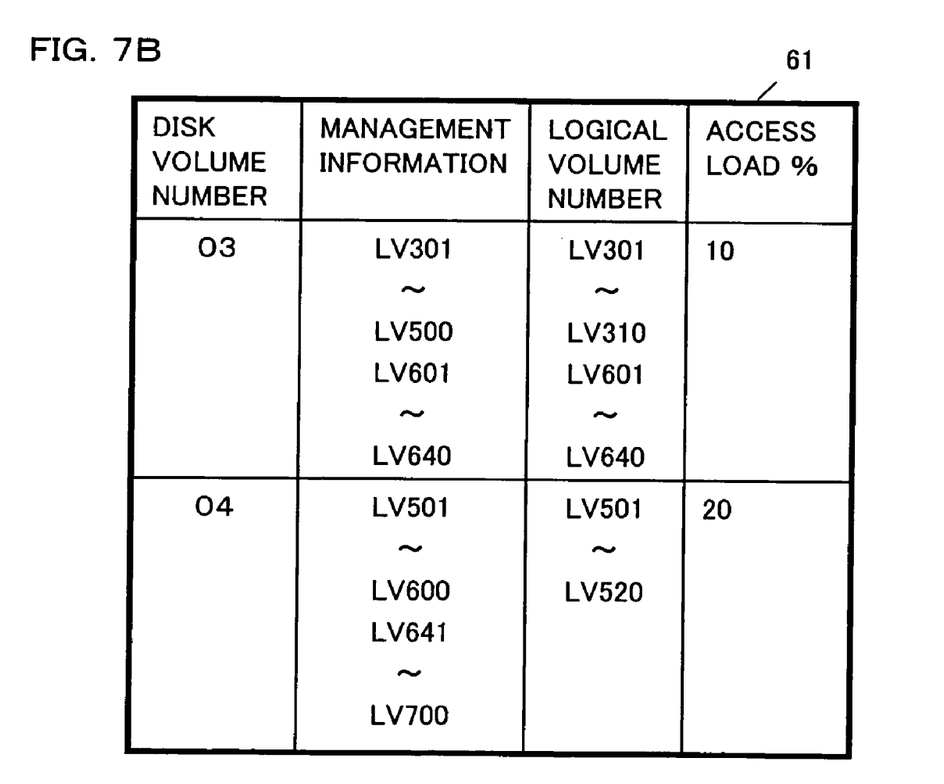

FIGS. 7A and 7B are second explanatory diagram of the management table.

FIG. 7A shows the previous state of the import processing.

For the purpose of a brief description, in the import processing, the amount of the access load is not changed. The import processing is performed on the basis of a unit of the logical volume.

Logical volumes LV601 to LV640 are read from the external storage medium 32.

Logical volume numbers LV301 to LV500 are assigned to a disk volume 51-03, as the management information. Logical volume numbers LV301 to LV310 denote the logical volumes for storing the data. Further, the access load thereof is 10%.

Logical volume numbers LV501 to LV700 are assigned to a disk volume 51-04, as the management information. Logical volume numbers LV501 to LV520 denote the logical volumes for storing the data. Further, the access load thereof is 20%.

Since the logical volume is copied from the external storage medium 32 to the cache disk 5, the disk volume 51-03 having the smallest amount of access load is selected. Further, when the access load is not changed, the logical volumes LV601 to LV640 determined to the disk volume 51-03 are sequentially stored. The data is copied to the storage medium 31. On the other hand, the disk volume 51-04 having a large access-load is not accessed.

FIG. 7B shows a state after the import processing.

As a consequence, the management information on the logical volumes LV601 to LV640 is generated for the disk volume 51-03, and the logical volumes LV601 to LV640 are stored to the disk volume 51-03.

On the other hand, the management information on the logical volumes LV601 to LV640 is deleted from the disk volume 51-04. In accordance with this, the management table 61 is changed.

Figure 8A:
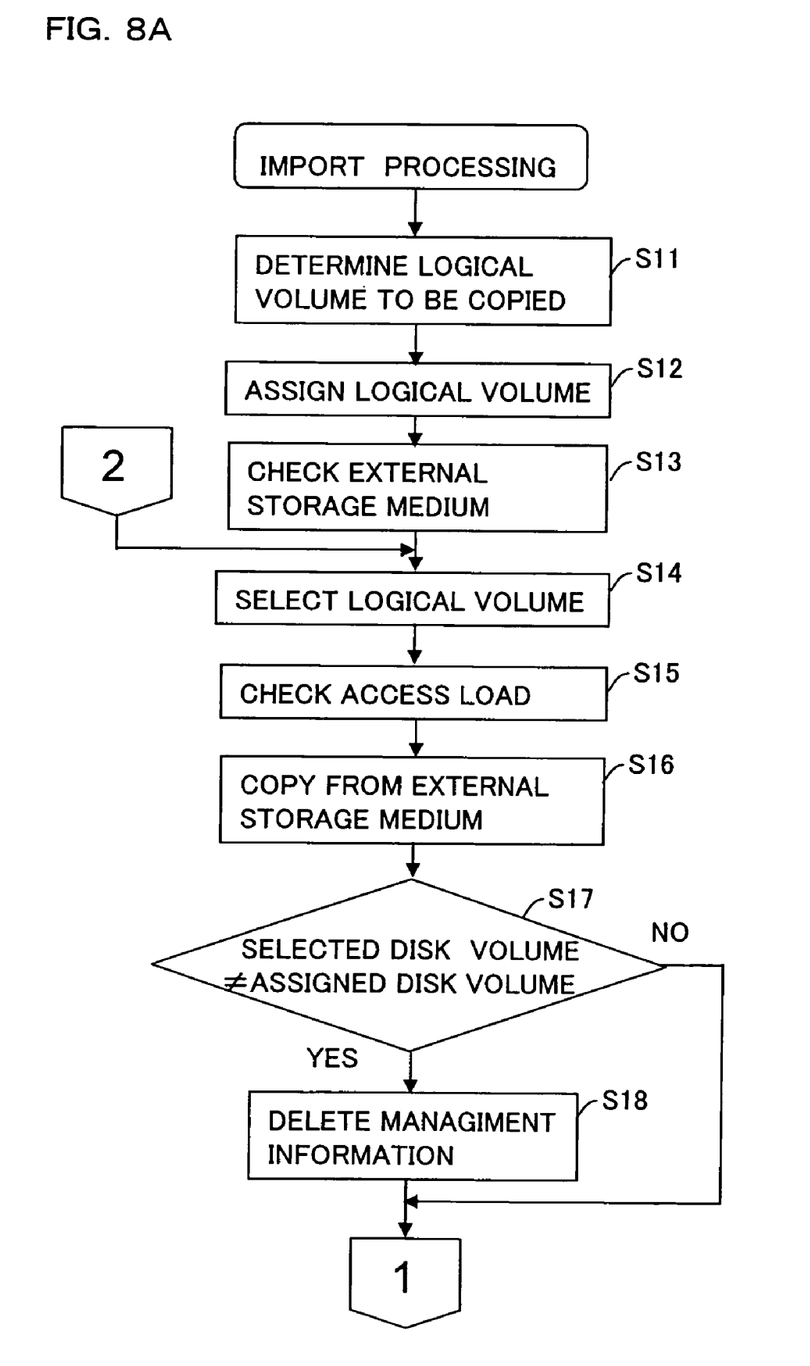
FIGS. 8A and 8B are a flowchart of the import processing.
Figure 8B:
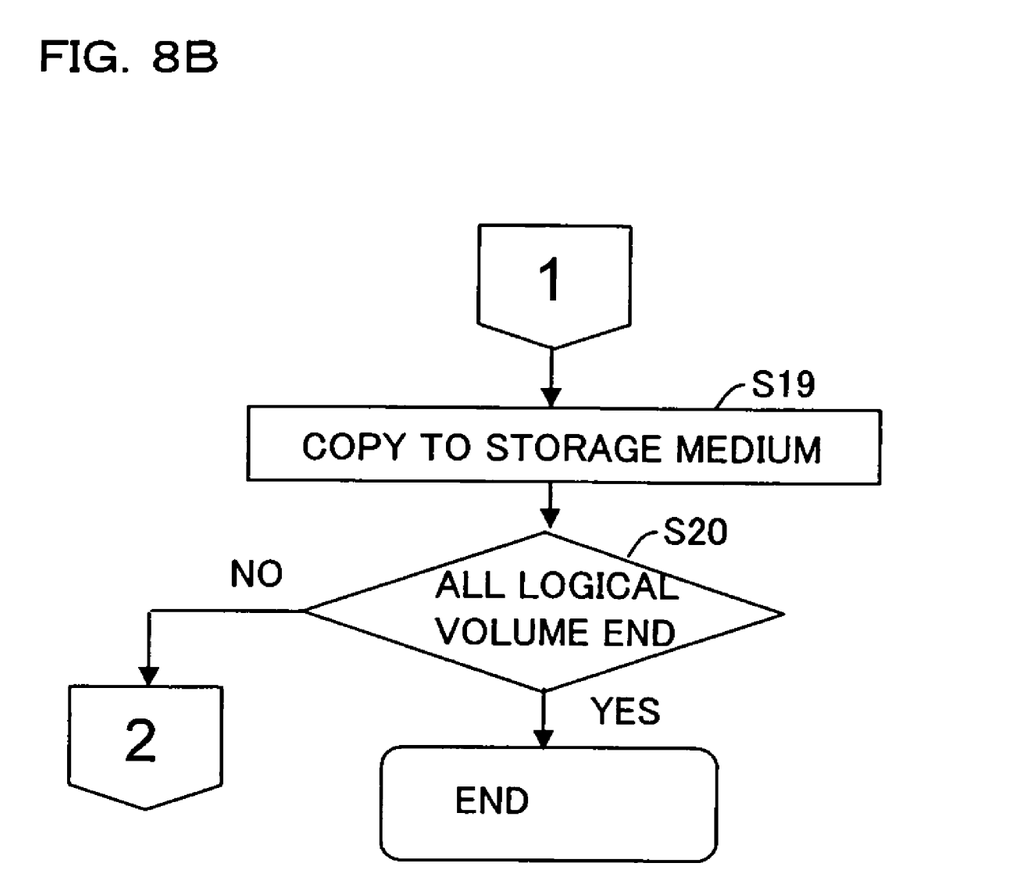

FIGS. 8A and 8B are a flowchart of the import processing.

The external storage medium 32 to be imported is loaded to the tape library apparatus 2.

First of all, plural logical volumes to be copied are determined (in step S11).

The disk volume 51 for storing the determined logical volume is assigned (in step S12). Specifically, the corresponding disk volume 51 is determined on the basis of the amount of the used disk volume 51 in the cache disk 5. Further, the management information of the logical volume to the assigned disk volume 51 is written.

The logical volume stored in the external storage medium 32 is checked (in step S13).

Thus, the logical volume to be read is determined.

Subsequently, the logical volume to be copied is selected from the determined logical volumes (in step S14).

The access load of the disk volume 51 is checked (in step S15).

The logical volume is copied from the external storage medium 32 to the disk volume 51 having the smallest access load (in step S16). At this time, when a plurality of the disk volumes that have the smallest access load are selected, the monitor 24 selects the disk volume of minimum usage from among them.

It is checked whether or not the selected disk volume 51 is the disk volume 51 assigned in advance (in step S17).

If the selected disk volume 51 is the assigned disk volume 51, the processing advances to step S19.

If the selected disk volume 51 is other than the assigned disk volume 51, the management information on the assigned disk volume 51 is deleted (in step S18).

Subsequently, the corresponding logical volume is copied to the storage medium 31 in the tape library apparatus 2 (in step S19). At this time, when the selected disk volume 51 is the assigned disk volume 51 in step 17, the management information on the assigned disk volume 51 is written.

It is checked whether or not the processing for all determined logical volumes ends (in step S20).

When it is determined that the processing for all logical volumes does not end, the processing then advances to step S14 whereupon the next logical volume is selected.

When it is determined that the processing for all logical volumes does not end, the import processing ends.

If data is lost by an erroneous operation of an operator, data discharged with the export function enables the restoring processing.

As mentioned above, a mechanism for dynamically changing the arrangement of the cache disk 5 is provided. As a consequence, the export/import function can be embodied without deterioration in processing performance by the access concentration to the specific disk volume 51.

What is claimed is:

1. A virtual library apparatus for emulating a library apparatus by storing a logical volume on a cache disk, the library apparatus having a first storage medium and a second storage medium, the virtual library apparatus comprising:
   a disk volume forming the cache disk;
   a determining unit configured to determine the logical volume to be copied;
   a monitor configured to monitor access load to the disk volume, and select the disk volume having the smallest access load on the basis of the monitoring result of the access load; and
   a copying unit configured to copy the determined logical volume from the first storage medium to the selected disk volume, and copy the copied logical volume from the disk volume to the second storage medium.

2. The virtual library apparatus according to claim 1, wherein the monitor obtains the access load on the basis of the total sum of access amount of the logical volume from the library apparatus and the largest access amount of the logical volume from a host computer.

3. The virtual library apparatus according to claim 2, wherein, when the monitor selects plural disk volumes having the smallest access load, the monitor selects the disk volume of minimum usage from among them.

4. The virtual library apparatus according to claim 1, wherein the disk volume for the determined logical volume is assigned in advance and management information for identifying the determined logical volume is stored to the assigned disk volume in advance, and when the copying unit performs the copying operation to the disk volume different from the assigned disk volume, the copying unit changes storage destination of the management information of the determined logical volume from the assigned disk volume to the disk volume of the copy destination.

5. A virtual library system, comprising:
   a library apparatus including a first storage medium, and a second storage medium; and
   a virtual library apparatus for emulating the library apparatus by storing a logical volume received from a host computer on a cache disk, the virtual library apparatus including:
   a disk volume forming the cache disk,
   a determining unit configured to determine a logical volume to be copied,
   a monitor configured to monitor access load to the disk volume, and selecting the disk volume having the smallest access load on the basis of the monitoring result of the access load, and
   a copying unit configured to copy the determined logical volume from the first storage medium to the selected disk volume, and copy the copied logical volume from the disk volume to the second storage medium.

6. The virtual library system according to claim 5, wherein the first storage medium is a storage medium for storing the logical volume, and the second storage medium is an external storage medium that is discharged out of the library apparatus.

7. The virtual library system according to claim 6, wherein, when the determined logical volume exists on the cache disk, the monitor selects the disk volume having the smallest access load from among the disk volumes storing the determined logical volume, and the copying unit copies the determined logical volume stored on the selected disk volume to the second storage medium.

8. The virtual library system according to claim 5, wherein the first storage medium is an external storage medium that is loaded to the library apparatus, and the second storage medium is a storage medium for storing the logical volume.

9. A method for copying a logical volume by a virtual library apparatus for emulating a library apparatus by storing the logical volume received from a host computer on a cache disk, the library apparatus having a first storage medium and a second storage medium, the method comprising the step of:
   (a) providing a disk volume forming the cache disk;
   (b) determining the logical volume to be copied;
   (c) monitoring access load to the disk volume;
   (d) selecting the disk volume having the smallest access load on the basis of the monitoring result;
   (e) copying the determined logical volume from the first storage medium of the library apparatus into the selected disk volume; and (d) copying the copied logical volume from the disk volume into the second storage medium of the library apparatus.

10. The method according to claim 9, wherein, in step (c), the access load is obtained on the basis of the total sum of access amount of the logical volume from the library. apparatus and the largest access amount of the logical volume from the host computer.

11. The method according to claim 9, wherein, in step (d), when plural disk volumes having the smallest access load are selected, the disk volume of minimum usage from among them is selected.

12. The method according to claim 9, further comprising:
assigning the determined logical volume to the disk volume,
storing management information for identifying the determined logical volume to the assigned disk volume,
changing storage destination of the management information of the determined logical volume from the assigned disk volume to the disk volume of the copy destination, upon copying the logical volume to the disk volume different from the assigned disk volume.

* * * * *

UNITED STATES PATENT AND TRADEMARK OFFICE
CERTIFICATE OF CORRECTION

PATENT NO. : 8,065,466 B2  
APPLICATION NO. : 12/222118  
DATED : November 22, 2011  
INVENTOR(S) : Naoyoshi Toshine Page 1 of 1

It is certified that error appears in the above-identified patent and that said Letters Patent is hereby corrected as shown below:

Column 11, Line 6, In Claim 10, delete "library." and insert -- library --, therefor.

Signed and Sealed this  
Thirty-first Day of January, 2012

David J. Kappos  
*Director of the United States Patent and Trademark Office*

UNITED STATES PATENT AND TRADEMARK OFFICE
CERTIFICATE OF CORRECTION

PATENT NO.      : 8,065,466 B2  
APPLICATION NO. : 12/222118  
DATED           : November 22, 2011  
INVENTOR(S)     : Naoyoshi Toshine Page 1 of 1

It is certified that error appears in the above-identified patent and that said Letters Patent is hereby corrected as shown below:

Column 11, Line 1, In Claim 9, delete "(d)" and insert -- (f) --, therefor.

Signed and Sealed this

Thirteenth Day of March, 2012

David J. Kappos
*Director of the United States Patent and Trademark Office*